US006711638B1

(12) United States Patent
Wu

(10) Patent No.: US 6,711,638 B1
(45) Date of Patent: Mar. 23, 2004

(54) VIDEO GRAPHICS ACCELERATOR CARD CONNECTOR ADAPTER

(75) Inventor: Peter Wu, Aeipei (TW)

(73) Assignee: Hsing Chau Industrial Co., Ltd., Taipei (TW)

( * ) Notice: Subject to any disclaimer, the term of this patent is extended or adjusted under 35 U.S.C. 154(b) by 224 days.

(21) Appl. No.: 10/067,341

(22) Filed: Feb. 7, 2002

(51) Int. Cl.[7] .............................................. G06F 13/00
(52) U.S. Cl. .......................................... 710/72; 710/62
(58) Field of Search ............................ 710/72, 62, 63; 700/17; 345/502, 572; 348/135

(56) References Cited

U.S. PATENT DOCUMENTS 4,965,751 A * 10/1990 Thayer et al. .............. 345/572
5,956,046 A * 9/1999 Kehlet et al. ............... 345/502
6,314,326 B1 * 11/2001 Fuchu ......................... 700/17

FOREIGN PATENT DOCUMENTS

EP 1329868 A2 * 7/2003 ............ G09G/3/20

* cited by examiner

*Primary Examiner*—Christopher B. Shin
(74) *Attorney, Agent, or Firm*—Varndell & Varndell, PLLC

(57) ABSTRACT

A video graphics accelerator card connector adapter is constructed to include a circuit board adapted for mounting in a surface box or a wall plate, a video graphics accelerator card 15pin connector socket soldered to the circuit board and adapted for receiving the video graphics accelerator card 15pin connector plug of the video signal cable of a computer monitor or connecting to the video graphics accelerator card 15pin connector socket of the host of a computer system through a video graphics accelerator card extension cable, and an insulation displacement connector soldered to the circuit board and adapted for receiving a local area network cable.

4 Claims, 8 Drawing Sheets

VIDEO GRAPHICS ACCELERATOR CARD CONNECTOR ADAPTER

BACKGROUND AND SUMMARY OF THE INVENTION

The present invention relates to a video graphics accelerator card connector adapter adapted for connection between the monitor and host of a computer system, enabling the monitor to be placed in a location far from the host.

A regular personal computer, as shown in FIG. 1, comprises a host 8 having a video graphics accelerator card (not shown) and a video graphics accelerator card 15pin connector socket 81 connected to the video graphics accelerator card and disposed on the outside, and a monitor 9 provided with a video cable 91 having a video graphics accelerator 15pin card connector plug 911 for connecting to the video graphics accelerator card 15pin connector socket 81 of the host 8. Due to length limitation of the video cable 91, the monitor 9 must be placed on the host 8 or positioned in a position near the host 8. In case of positioning the monitor 9 in a place for example, the entrance-hall of a multimedia renter to show a program to the publics, the host 8 shall be positioned near the monitor 9, or a coaxial cable shall be used and soldered with its two ends to the video graphics accelerator card 15pin connector plug 911 and the video graphics accelerator card 15pin connector socket 81.

The present invention has been accomplished under the circumstances in view. It is the main object of the present invention to provide a video graphics accelerator card connector, which is adapted for connection between the monitor and host of a computer system, enabling the monitor to be placed in a location far from the host. To achieve this and other objects of the present invention, the video graphics accelerator card connector adapter comprises a circuit board adapted for mounting in a surface box or a wall plate, a video graphics accelerator card 15pin connector socket soldered to the circuit board and adapted for receiving the video graphics accelerator card 15pin connector plug of the video signal cable of a computer monitor or connecting to the video graphics accelerator card 15pin connector socket of the host of a computer system through a video graphics accelerator card extension cable, and an insulation displacement connector soldered to the circuit board and adapted for receiving a local area network cable. A screw terminal may be used instead of the insulation displacement connector for receiving a local area network cable.

DETAILED DESCRIPTION OF THE PREFERRED EMBODIMENT

Figure 1:
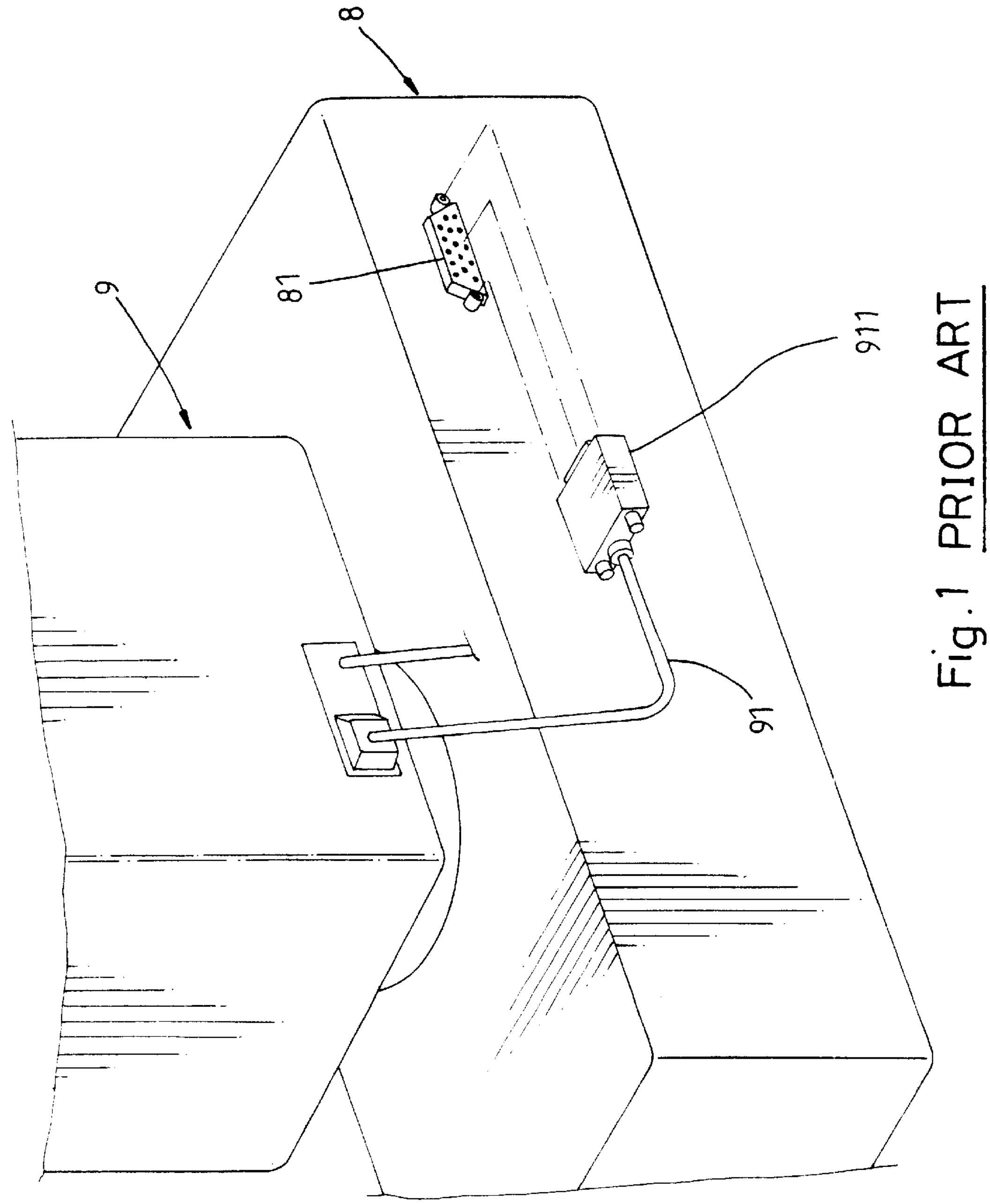
Fig.1 PRIOR ART
FIG. 1 illustrates the connection between the monitor and host of a personal computer.

Referring to FIGS. from 2 through 4, a video graphics accelerator card connector adapter 1 is shown comprised of a video graphics accelerator card 15pin connector socket 11, a circuit board 12, an insulation displacement connector 13, and a surface box 15. The video graphics accelerator card 15pin connector socket 11 is soldered to the circuit board 12 at the top. The insulation displacement connector 13 is soldered to the circuit board 12 at the top behind the video graphics accelerator card 15pin connector socket 11, and adapted for the connection of the twisted wires 211 at one end 21 of a local area network cable 2. The surface box 15 comprises a bottom panel 151, which holds the assembly of the circuit board 12, the video graphics accelerator card 15pin connector socket 11 and the insulation displacement connector 13, and a top cover 152 covered on the bottom panel 151 over the assembly of the circuit board 12, the video graphics accelerator card 15pin connector socket 11 and the insulation displacement connector 13. The top cover 152 has a front opening 1521, which receives the front receiving side 111 of the video graphics accelerator card 15pin connector socket 11.

Figure 5:
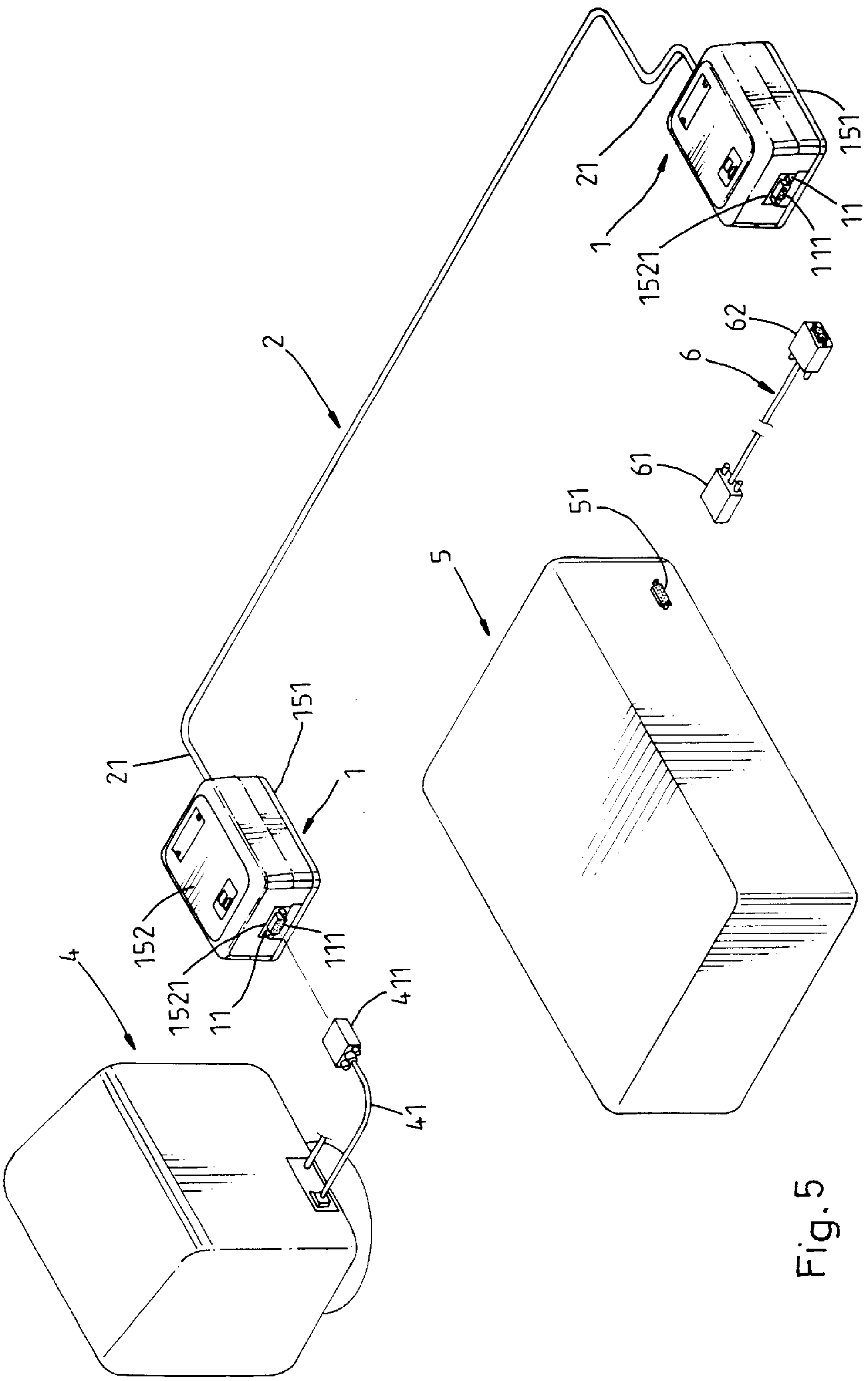
FIG. 5 illustrates an application example of the first embodiment of the present invention.

Referring to FIG. 5, two video graphics accelerator card connector adapter 1 are respectively connected to the two ends 21 of a local area network cable 2, forming a video graphics accelerator card connector adapter cable for connection between the computer monitor 4 and host 5 of a computer system. The video graphics accelerator card 15pin connector socket 11 of one video graphics accelerator card 15pin connector adapter 1 receives the video graphics accelerator card 15pin connector plug 411 of the video signal cable 41 of the computer monitor 4. The video graphics accelerator card 15pin connector socket 11 of the other video graphics accelerator card connector adapter 1 is connected to the video graphics accelerator card 15pin connector socket 51 of the host 5 through a video graphics accelerator card extension cable 6, which has a connector plug 62 disposed at one end for connection to the video graphics accelerator card 15pin connector socket 11 of one video graphics accelerator card connector adapter 1 and a connector socket 61 disposed at the other end for connection to the video graphics accelerator card 15pin connector socket 51 of the host 5. By means of the aforesaid arrangement, the computer monitor 4 can be placed at a location far from the host 5.

Figure 6:
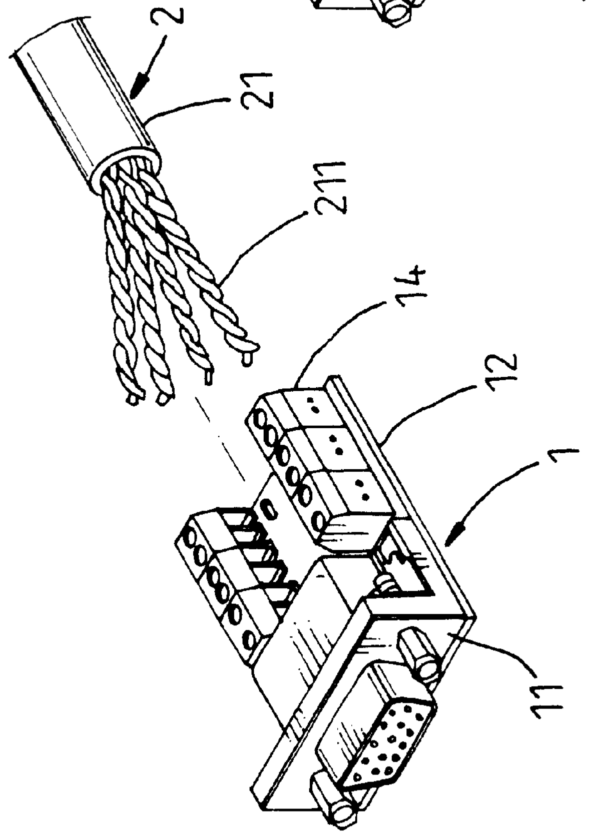
FIG. 6 is an assembly view of a part of a video graphics accelerator card connector adapter according to a second embodiment of the present invention.
Figure 3:
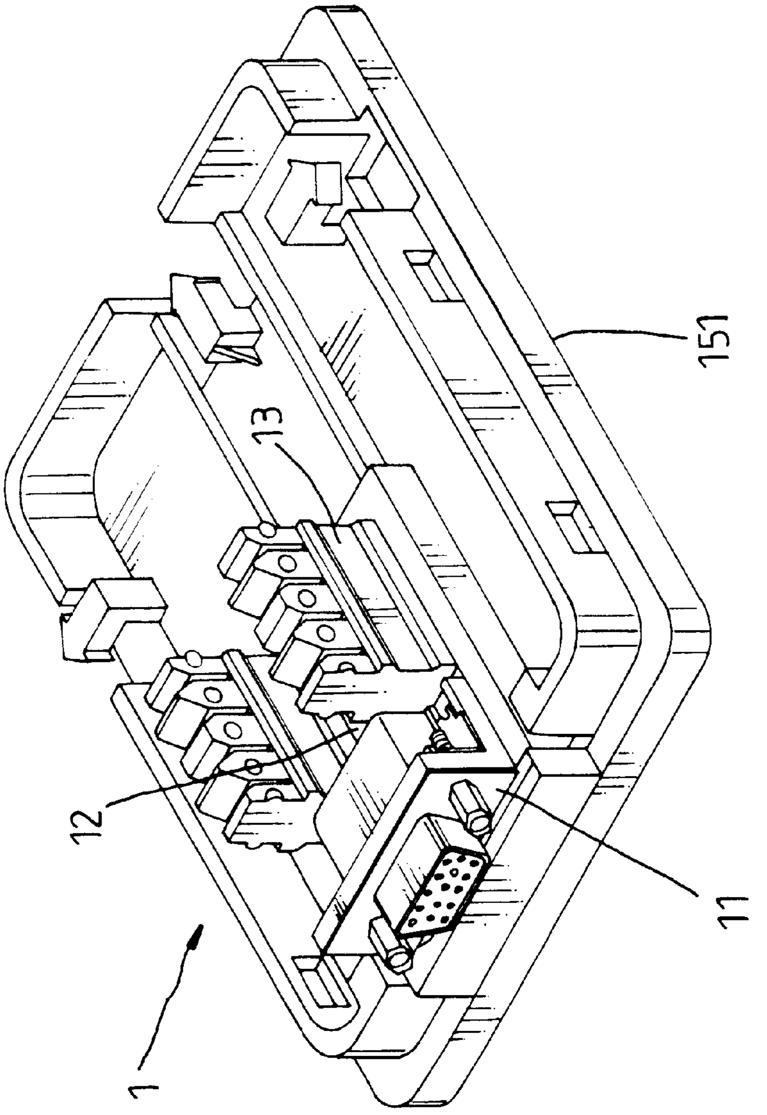
FIG. 3 is an assembly view of the video graphics accelerator card connector adapter of the first embodiment according to the present invention before the installation of the top cover of the surface box.
Figure 4:
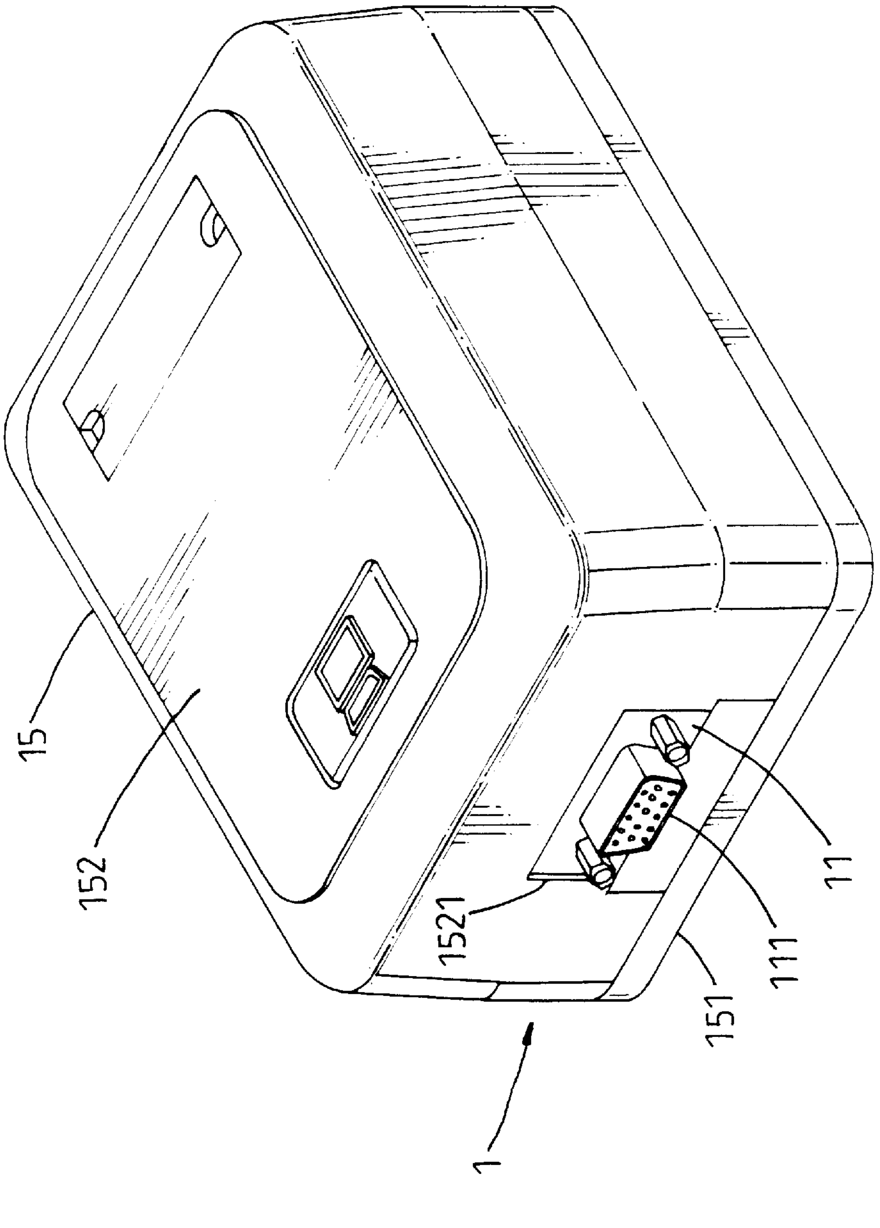
FIG. 4 is an elevational assembly view of the video graphics accelerator card connector adapter according to the first embodiment of the present invention.
Figure 7:
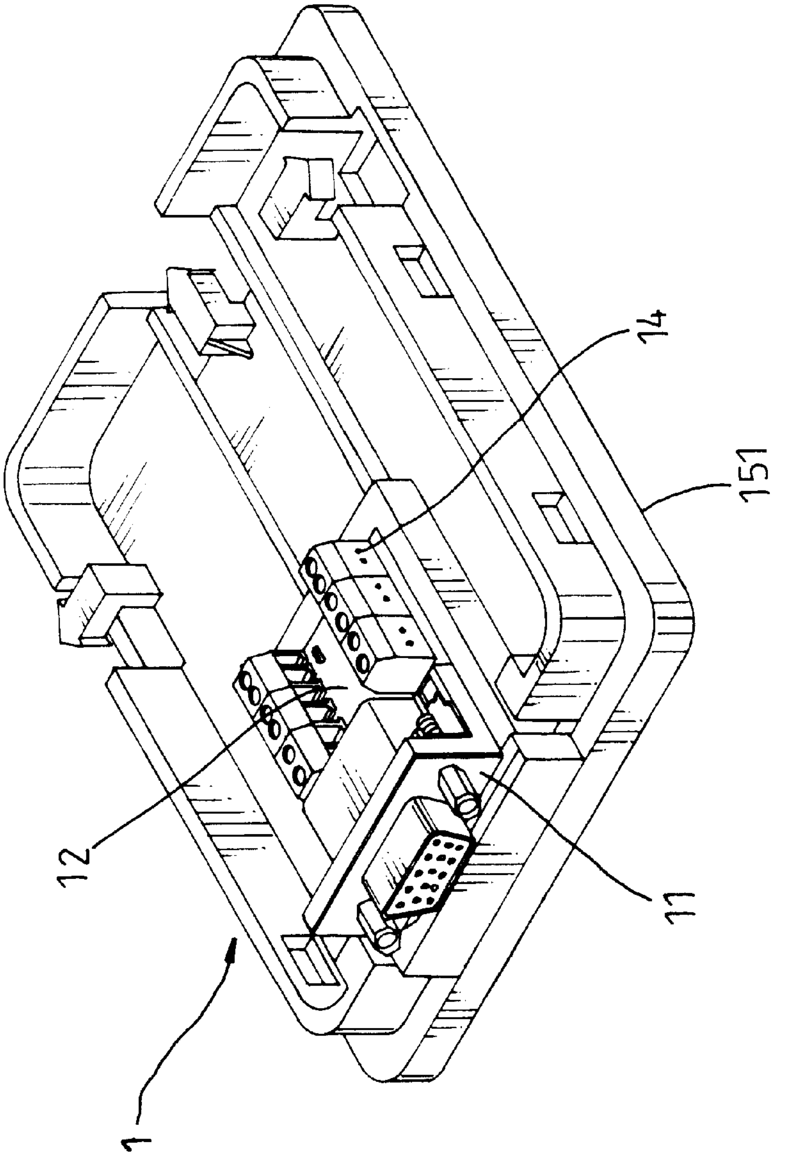
FIG. 7 is an assembly view of the video graphics accelerator card connector adapter according to the second embodiment of the present invention before the installation of the top cover of the surface box.

Referring to FIGS. 6 and 7, a screw terminal 14 may be used for connecting the twisted wires 211 of the local area network cable 2 to the circuit board 12 of the video graphics accelerator card connector adapter 1 instead of the aforesaid insulation displacement connector 13.

Figure 2:
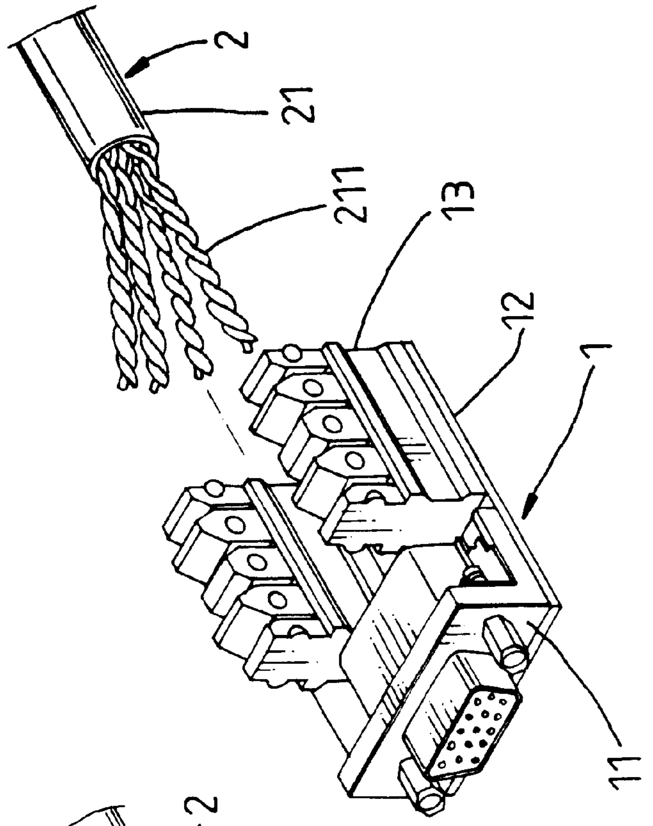
FIG. 2 is an assembly view of a part of a video graphics accelerator card connector adapter according to a first embodiment of the present invention.
Figure 8:
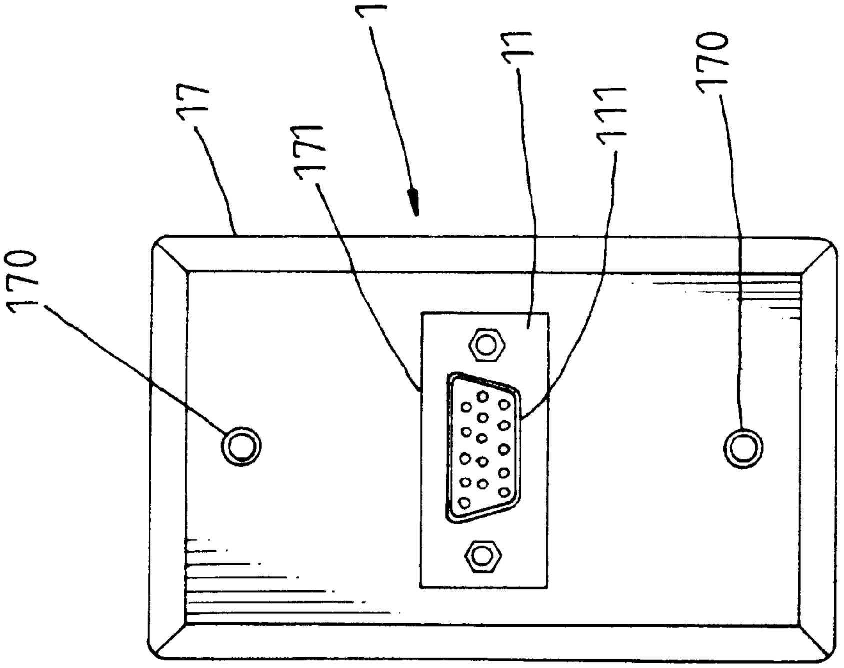
FIG. 8 is a front view of a video graphics accelerator card connector adapter according to a third embodiment of the present invention.
Figure 9:
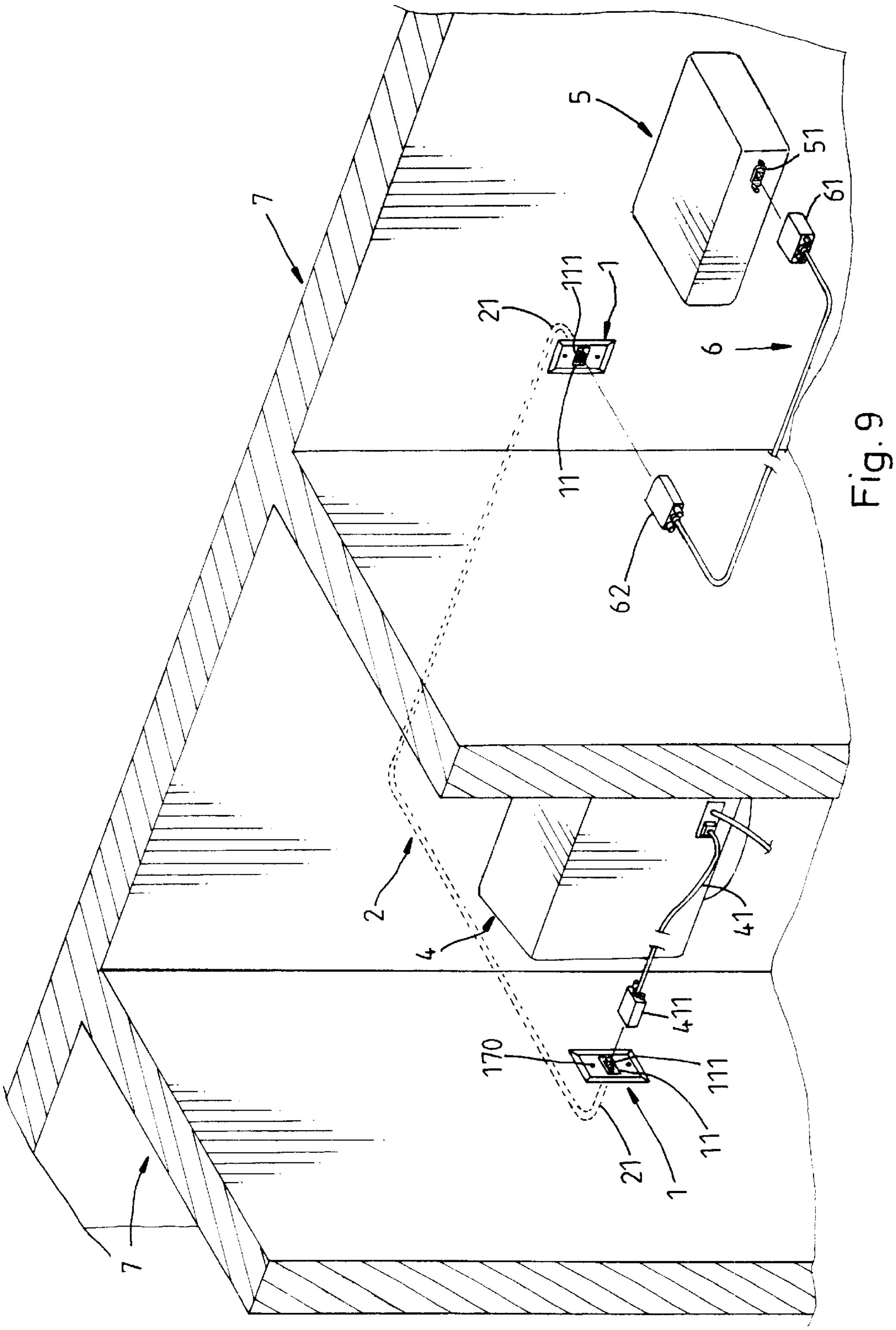
FIG. 9 illustrates an application example of the third embodiment of the present invention.

FIGS. 8 and 9 show an alternate form of the present invention. According to this alternate form, a wall plate 17 is used instead of the aforesaid surface box 15, i.e., the video graphics accelerator card connector adapter 1 is comprised of a video graphics accelerator card 15pin connector socket 11, a circuit board 12, an insulation displacement connector 13, and a wall plate 17 (see also FIG. 2). The assembly of the circuit board 12, the video graphics accelerator card 15pin connector socket 11 and the insulation displacement connector 13 is installed in the wall plate 17. The wall plate 17 has mounting holes 170 for fastening to the wall 7 of a building by fastening elements, for example, screws, and an opening 171, which receives the front receiving side 111 of the video graphics accelerator card 15pin connector socket 11. As shown in FIG. 9, two video graphics accelerator card connector adapters 1 are mounted on the wall 7 of the building at different locations, and connected to the ends 21 of a local area network cable 2, which is embedded in the wall 7. The computer monitor 4 is connected to one video graphics accelerator card connector adapter 1 by the video graphics accelerator card 15pin connector plug 411 of its video signal cable 41. The video graphics accelerator card connector socket 51 of the host 5 is connected to the other video graphics accelerator card connector adapter 1 through a video graphics accelerator card extension cable 6. According to this alternate form, a screw terminal 14 may be used for connecting the twisted wires 211 of the local are network cable 2 to the circuit board 12 of the video graphics accelerator card connector adapter 1 instead of the insulation displacement connector 13.

A prototype of video graphics accelerator card connector adapter has been constructed with the features of the annexed drawings of FIGS. 2~9. The video graphics accelerator card connector adapter functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A video graphics accelerator card connector adapter comprising:

a surface box, said surface box comprising a bottom panel, and a top cover covering said bottom panel, said top cover having a front opening;

a circuit board fixedly mounted on said bottom panel inside said surface box;

a video graphics accelerator card 15pin connector socket soldered to said circuit board, said video graphics accelerator card 15pin connector socket having a receiving side fitted into the front opening of said surface box and adapted for receiving the video graphics accelerator card 15pin connector plug of the video signal cable of a computer monitor or connecting to the video graphics accelerator card 15pin connector socket of the host of a computer system through a video graphics accelerator card extension cable, which has a connector plug disposed at one end for connection to said video graphics accelerator card 15pin connector socket of and a connector socket disposed at an opposite end for connection to the video graphics accelerator card 15pin connector socket of the host of a computer system; and an insulation displacement connector soldered to said circuit board and adapted for receiving a local area network cable.

2. A video graphics accelerator card connector adapter comprising:

a surface box, said surface box comprising a bottom panel, and a top cover covering said bottom panel, said top cover having a front opening;

a circuit board fixedly mounted on said bottom panel inside said surface box;

a video graphics accelerator card 15pin connector socket soldered to said circuit board, said video graphics accelerator card 15pin connector socket having a receiving side fitted into the front opening of said top cover of said surface box and adapted for receiving the video graphics accelerator card 15pin connector plug of the video signal cable of a computer monitor or connecting to the video graphics accelerator card 15pin connector socket of the host of a computer system through a video graphics accelerator card extension cable, which has a connector plug disposed at one end for connection to said video graphics accelerator card 15pin connector socket of and a connector socket disposed at an opposite end for connection to the video graphics accelerator card 15pin connector socket of the host of a computer system; and a screw terminal soldered to said circuit board and adapted for receiving a local area network cable.

3. A video graphics accelerator card connector adapter comprising:

a wall plate, said wall plate having an opening;

a circuit board fixedly mounted on said wall plate;

a video graphics accelerator card 15pin connector socket soldered to said circuit board, said video graphics accelerator video graphics accelerator card 15pin connector socket having a receiving side fitted into the opening of said wall plate and adapted for receiving the video graphics accelerator card 15pin connector plug of the video signal cable of a computer monitor or connecting to the video graphics accelerator card 15pin connector socket of the host of a computer system through a video graphics accelerator card extension cable, which has a connector plug disposed at one end for connection to said video graphics accelerator card 15pin connector socket of and a connector socket disposed at an opposite end for connection to the video graphics accelerator card 15pin connector socket of the host of a computer system; and an insulation displacement connector soldered to said circuit board and adapted for receiving a local area network cable.

4. A video graphics accelerator card connector adapter comprising:

a wall plate, said wall plate having an opening;

a circuit board fixedly mounted on said wall plate;

a video graphics accelerator card 15pin connector socket soldered to said circuit board, said video graphics accelerator card 15pin connector socket having a receiving side fitted into the opening of said wall plate and adapted for receiving the video graphics accelerator card 15pin connector plug of the video signal cable of a computer monitor or connecting to the video graphics accelerator card 15pin connector socket of the host of a computer system through a video graphics accelerator card extension cable, which has a connector plug disposed at one end for connection to said video graphics accelerator card 15pin connector socket of and a connector socket disposed at an opposite end for connection to the video graphics accelerator card 15pin connector socket of the host of a computer system; and a screw terminal soldered to said circuit board and adapted for receiving a local area network cable.

* * * * *